D. ANDERSON.
HAND RAKE.
APPLICATION FILED APR. 10, 1916.
1,197,003.
Patented Sept. 5, 1916.
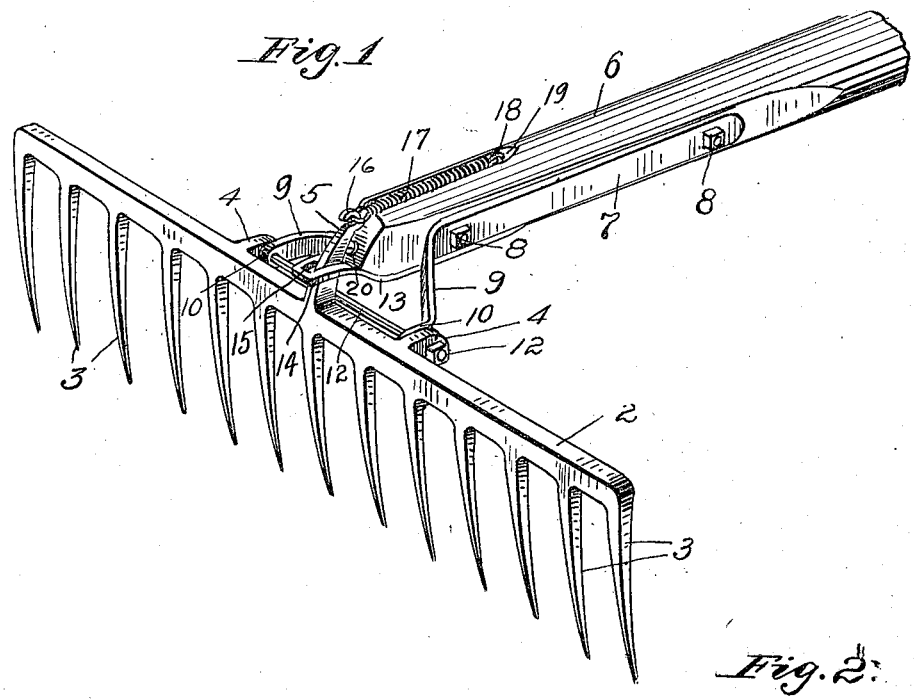
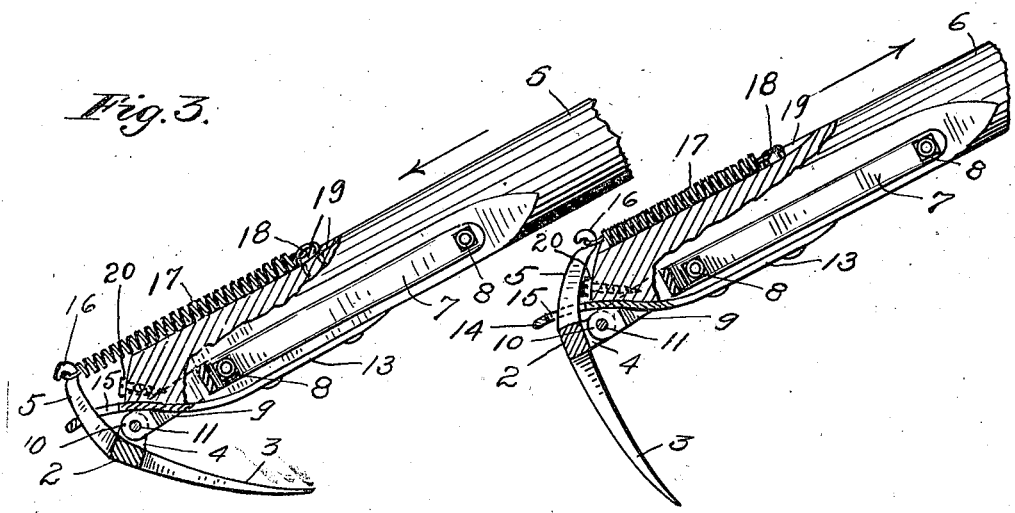
Witnesses
E. A. Paul
J. E. Sorensen
Inventor
DANIEL ANDERSON
By his Attorneys
Paul & Paul

UNITED STATES PATENT OFFICE.

DANIEL ANDERSON, OF McINTOSH, MINNESOTA.

HAND-RAKE.

1,197,003.

Specification of Letters Patent.  Patented Sept. 5, 1916.

Application filed April 10, 1916.  Serial No. 90,071.

*To all whom it may concern:*

Be it known that I, DANIEL ANDERSON, citizen of the United States, resident of McIntosh, county of Polk, State of Minnesota, have invented certain new and useful Improvements in Hand-Rakes, of which the following is a specification.

The object of my invention is to provide a rake adapted for general purposes, but used particularly for raking lawns to gather up the dead grass or leaves thereon.

A further object is to provide a rake which will automatically clear itself on the back stroke of the rake of any leaves or grass which may be clinging to the teeth upon the completion of the forward stroke of the rake.

Other objects of the invention will appear from the following detailed description.

The invention consists generally in various constructions and combinations, all as hereinafter described and particularly pointed out in the claims.

In the accompanying drawings forming part of this specification, Figure 1 is a perspective view of the head and a portion of the handle of a rake embodying my invention, Fig. 2 is a sectional view of the same, Fig. 3 is a similar view, showing the teeth in their tilted position for clearing themselves of the accumulation of grass leaves or other refuse.

In the drawing, 2 represents the head of the rake, having a series of tines or teeth 3. This head and the teeth are preferably formed of metal, as usual in garden rakes, of this type, the teeth being of any suitable length and size, according to the purpose for which the rake is to be used. The rear face of the head 2 is provided with outwardly projecting lugs 4 and the upper face of the head at the center thereof has an upwardly projecting arm 5.

6 is the handle, of suitable length, having bars 7 upon opposite sides thereof secured together by suitable means, such as bolts 8 and provided with outwardly turned portions 9 terminating in parallel ends 10 having holes 11 therein to receive a bolt 12 which is fitted into holes in the lugs 4 and forms a pivot pin for the bars 7. A strap 13 is secured to the underside of the handle and is provided with a loop 14 turned upwardly and projecting beyond the end of the handle and having a slot 15 to receive the curved arm 5 when the parts are assembled. A hook 16 is formed on the end of the arm 5 and a coiled spring 17 is connected at one end to said hook and at its opposite end to a hook 18 mounted within a groove 19 which is preferably formed in the upper surface of the handle and is adapted to receive the coiled spring 17. I prefer also to mount a stop 20 in the end of the handle in the path of the arm 5 to contact therewith and limit the movement of the arm toward the handle.

The operation of the rake is as follows: When the head is drawn forward toward the person grasping the handle, the teeth or tines will rake up the material, such as grass or leaves, and when the end of the stroke is reached and the operator turns the rake backward, the head will swing on its pivot and the arm 5 will be oscillated also until it engages the loop at the outer end of the slot 15 and thereupon the rocking of the head in that direction will be checked. At this point, however, the teeth will lie substantially flat on the ground, as indicated in Fig. 3, and any leaves or dry grass which may be entangled with the teeth will, upon striking the ground, be held thereby and the rake be pushed out of engagement, so that by the time the end of the backward stroke of the rake is reached the teeth will be entirely clear, ready for the forward or gathering stroke to be repeated. When the teeth are tilted downward to the position shown in Fig. 3, the spring 17 will be put under tension so that, upon the beginning of the forward stroke of the rake, the teeth will be returned to their normal position.

The rake may be made in various sizes and in various ways the details of construction herein shown and described may be modified without departing from the spirit of my invention.

I claim as my invention:

1. A rake comprising a handle, bars secured thereto upon opposite sides thereof and having diverging end portions projecting beyond the end of said handle, a rake head having teeth and rearwardly projecting ears, a pivot bolt passing through said ears and the projecting ends of said bars, means for yieldingly holding said head and teeth at right angles substantially to said handle and permitting said head to swing inwardly and backwardly to a substantially horizontal position, an arm mounted on said head and means in the path of said arm for limiting the movement of said head in both directions.

2. A rake comprising a handle, a head pivoted thereon and provided with teeth and with an upwardly projecting arm, a loop mounted on said handle and through which said arm projects, means yieldingly connecting said arm with said handle for yieldingly resisting the movement of said head in one direction, said loop having means forming a stop for limiting the movement of said arm in that direction.

3. A rake comprising a handle, a head pivoted on said handle and having teeth, a rod secured to said handle and projecting downwardly therefrom and provided with a longitudinal slot, an arm centrally mounted on said head and projecting through said slot, a coiled spring connected to said arm and to said handle, the ends of said slot limiting the movement of said arm in both directions, the forward movement of the rake swinging said head to its raking position and said arm in contact with the forward end of said slot, backward movement of the rake tilting said head and teeth to a substantially horizontal or teeth clearing position with said arm in contact with the opposite end of said slot.

In witness whereof, I have hereunto set my hand this 30" day of March, 1916.

DANIEL ANDERSON.